(12) United States Patent
Youn

(10) Patent No.: US 6,535,466 B1
(45) Date of Patent: Mar. 18, 2003

(54) APPARATUS AND METHOD FOR ACCESSING DATA TRACKS ON AN OPTICAL DISK

(75) Inventor: Jeong Chae Youn, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 178 days.

(21) Appl. No.: 09/606,086

(22) Filed: Jun. 29, 2000

(30) Foreign Application Priority Data

Jun. 29, 1999 (KR) .......................................... 99-25493

(51) Int. Cl.[7] .............................................. G11B 21/08
(52) U.S. Cl. .................................. 369/30.17; 369/30.12
(58) Field of Search ............................ 369/30.17, 30.1, 369/30.11, 30.12, 30.13, 44.28, 44.27; 360/77.02, 78.04, 78.06

(56) References Cited

U.S. PATENT DOCUMENTS

| | | | | | |
|---|---|---|---|---|---|
| 5,060,208 A | * | 10/1991 | Nagai et al. | .................. | 369/13 |
| 5,077,716 A | * | 12/1991 | Takeda et al. | ................. | 369/32 |
| 5,177,719 A | * | 1/1993 | Yamada et al. | ................ | 369/32 |
| 5,220,547 A | * | 6/1993 | Yasukawa et al. | ............ | 369/32 |
| 5,315,571 A | * | 5/1994 | Maeda et al. | .................. | 369/50 |
| 5,408,454 A | * | 4/1995 | Hasegawa | ................ | 369/44.25 |
| 6,088,314 A | * | 7/2000 | Tachibana et al. | ............ | 369/50 |

FOREIGN PATENT DOCUMENTS

| | | | | |
|---|---|---|---|---|
| JP | 61-233469 | * | 10/1986 | .............. 369/30.17 |
| JP | 6-325396 | * | 11/1994 | .............. 369/30.17 |

* cited by examiner

*Primary Examiner*—Tan Dinh
(74) *Attorney, Agent, or Firm*—Birch, Stewart, Kolasch & Birch, LLP

(57) ABSTRACT

The method and apparatus for accessing data tracks calculate a reproduction speed of a target location based on a current rotation speed, adjust the speed of a data reading clock to the calculated rotation speed during movement of an optical pickup to the target location, and process signals reproduced at the target location with the adjusted data reading clock to restore the signals into data. The above procedures of changing the clock for data reading before an optical pickup is moved to a target location make it possible to reproduce recorded signals on an optical disk immediately after movement of optical pickup to the target location and to achieve quick access and stabilization in a track jump operation.

24 Claims, 4 Drawing Sheets

Conventional Art $Z_0$ : *the reproduction speed at the inner-most track*

*Conventional Art*

APPARATUS AND METHOD FOR ACCESSING DATA TRACKS ON AN OPTICAL DISK

BACKGROUND OF THE INVENTION

1. Field of the Invention

The present invention relates to method and apparatus for accessing data tracks on an optical disk.

2. Description of the Related Art

In general, an optical disk is a circular plate. The diameter of the inner-most track of the optical disk is about 50 mm, and the diameter of the outer-most track is about 116 mm.

When an optical disk with such dimensions is reproduced, the disk is rotated in a constant angular velocity (CAV) mode as shown in FIG. 1, so that the reproduction speed, that is, the linear velocity of a track is increased as the reproduction position moves radially outward. According to the above characteristics, when an optical pickup is moved radially by a sled motor to process a long jump from a current reproduction position to a new desired position, the reproduction speed will have to be increased or decreased at the target track. Signals reproduced from the target track can be restored into original data only after a data reading clock is synchronized with the signals reproduced at the new speed. This operation is explained in more detail below.

The frequency of reproduced signals changes when an optical pickup moves to a target track, and a phase lock loop (PLL) tries to synchronize an internal data reading clock, in frequency and phase, with the signals reproduced at the target track.

During the synchronizing process, if a predetermined number of sync signals are detected from the high frequency signals (referred as 'RF signals' hereinafter) read out by an optical pickup within a specific time window, a good frame sync (GFS) signal is generated. Because the GFS signal means successful synchronization, the reproduced signals can be processed and restored into original data using the synchronized data reading clock just after the GFS signal is generated.

However, because the above-explained data track accessing method gradually changes the data reading clock, synchronized with reproduced signals from the current frequency, to a different frequency synchronized with signals reproduced from the target track, generation of the GFS signal is delayed. And, when the optical pickup moves a long distance, the difference in reproduction speed between a current track and a desired track is too large to perform synchronization gradually. As a result, synchronization of the data reading clock with signals reproduced from the desired or target location occasionally fails, and this failure in synchronization causes a spindle motor to diverge.

SUMMARY OF THE INVENTION

The apparatus and method for accessing data tracks of an optical disk adjust a data reading clock, used in converting reproduced signals into digital data, before the movement of an optical pickup to a target location is completed. When a track jump request is received, the current rotation speed is measured, and using a linear function, a controller calculates the reproduction speed at the target location based on the current rotation speed and the target location. The controller then adjusts the data reading clock based on the calculated reproduction speed.

Because the data reading clock is adjusted prior to reproduction at the target location, signals reproduced at the target location can be readily converted into digital data. This significantly reduces access time and improves the stability of the reproduction operation.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
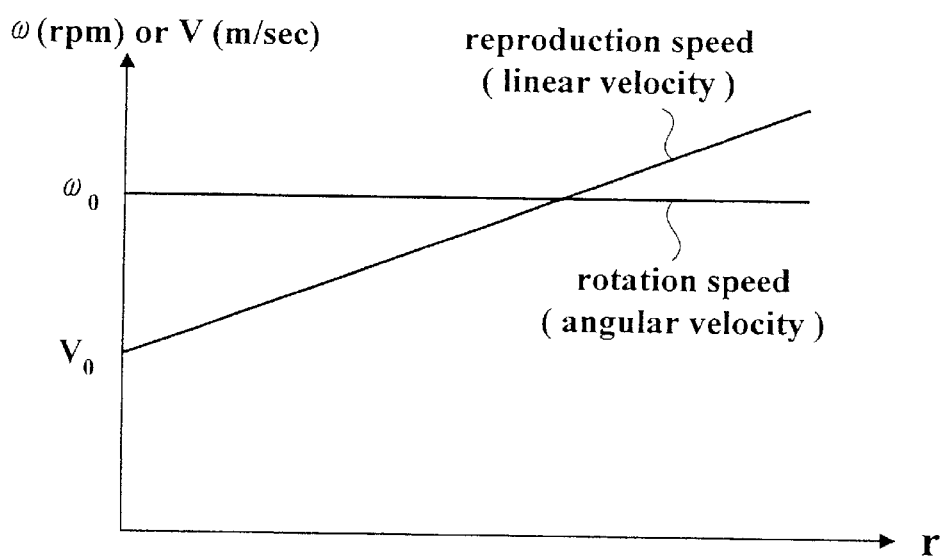
FIG. 1 is a speed graph of an optical disk rotating in a constant angular velocity mode.
Figure 2:
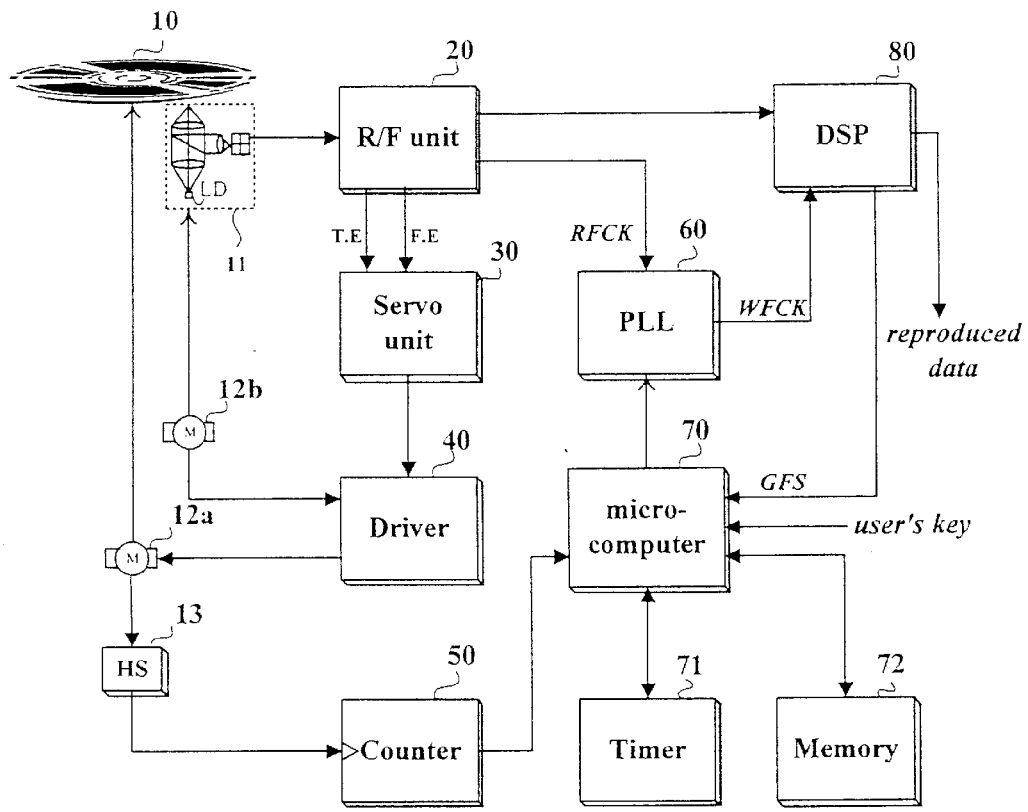
FIG. 2 is a simplified block diagram of a disk reproduction apparatus for accessing data tracks on an optical disk according to the present invention.

FIG. 2 depicts a block diagram of a preferred embodiment of an optical disk device according to the present invention. As shown, the device includes an optical pickup 11 for detecting recorded digital signals by converting a laser beam reflected across pits formed in the surface of a optical disk 10 into electric signals; a spindle motor 12a for rotating the inserted optical disk 10; a sled motor 12b for moving the optical pickup 11 radially on the disk 10; a driver 40 for driving the spindle motor 12a and the sled motor 12b, separately; a Hall sensor 13 for generating several pulses every revolution of the spindle motor 12a; a counter 50 for counting the pulses from the Hall sensor 13; an R/F unit 20 for equalizing and shaping analog RF signals detected by the optical pickup 11 into binary signals; a servo unit 30 for controlling the optical pickup 11 and the rotation of the optical disk 10 based upon a focussing error signal and a tracking error signal produced by the R/F unit 20; a phased-lock loop (PLL) 60 for synchronizing the frequency and phase of an internal data reading clock with a binary signal clock output from the R/F unit 20; a digital signal processor (DSP) 80 for processing the binary signals output from the R/F unit 20 based on the data reading clock of the PLL 60 to restore the binary signals into original digital data; a timer 71 which starts or stops according to the control of a microcomputer 70; a memory 72 storing the number of pulses to be detected within a specific time window as reference values for various rotation speeds; and the microcomputer 70 for controlling the servo unit 30 and the PLL 60 when the optical pickup 11 moves, and for controlling the overall data reproducing process.

Figure 3:
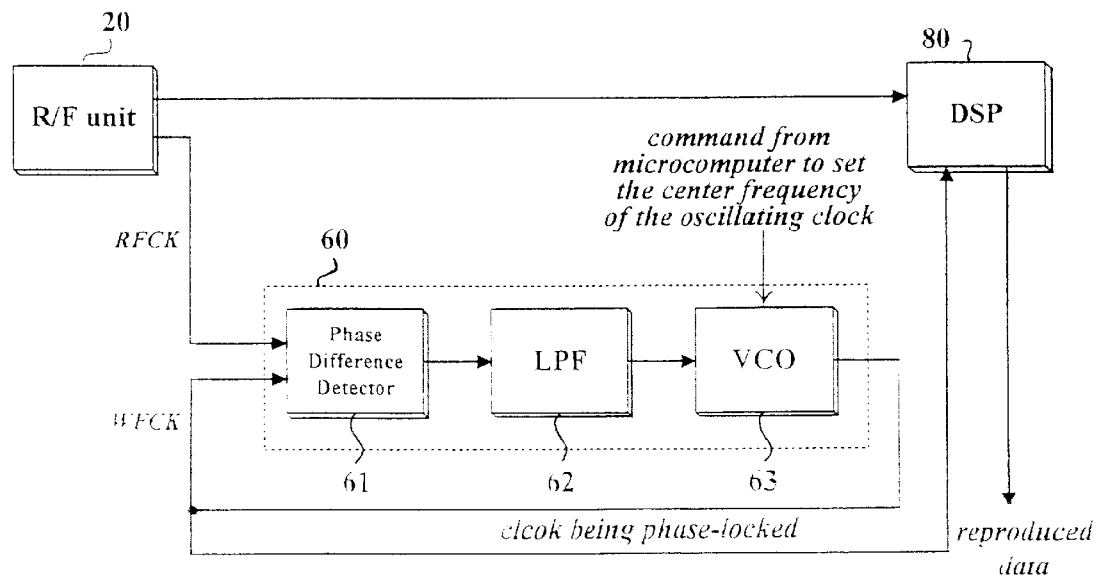
FIG. 3 shows the phase lock loop (PLL) of FIG. 2 in more detail.

As shown in detail in FIG. 3, the PLL 60 includes a phase difference detector 61, which compares the phase of the binary signal clock RFCK from the R/F unit 20 with the phase of a self-oscillating clock WFCK and which generates a phase difference signal whose pulse width is proportional to the phase gap between the binary and self-oscillating clocks RFCK and WFCK; a low-pass filter 62 averaging the phase difference signal; and a voltage-controlled oscillator (VCO) 63 for adjusting the frequency of the self-oscillating clock, the center frequency of which is set by a command from the microcomputer 70, according to the averaged phase difference signal.

Figure 4:
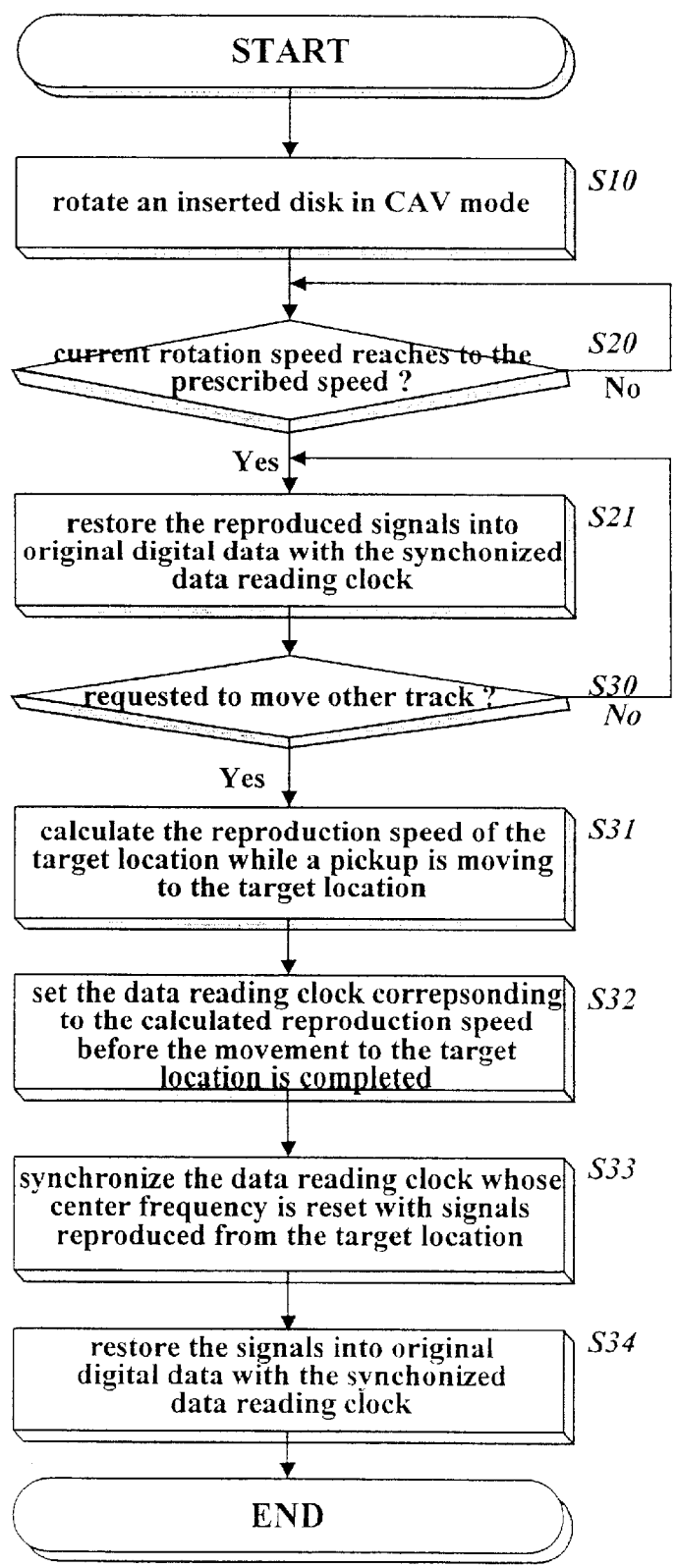
FIG. 4 is a flow diagram of the preferred embodiment for accessing data tracks on an optical disk according to the present invention.

FIG. 4 is a flow diagram of a preferred embodiment for quickly accessing a target track on an optical disk according to the present invention. The flow chart of FIG. 4, as carried out by the disk device structured as shown in FIGS. 2 and 3, will be described below.

When the optical disk 10 is inserted, the microcomputer 70 drives the spindle motor 12a through the servo unit 30 and the driver 40 to initially load the optical disk 10 (see step S10). At that time, the microcomputer 70 has a prescribed starting voltage applied to the spindle motor 12a to rotate the optical disk 10 in the CAV mode.

In step S20 the rotation speed of the disk 10 reaches a prescribed speed, for example 5000 rpm, the internal clock of the PLL 60 is adjusted to become synchronized with the binary signal clock produced from the reproduced signals, and the optical pickup 11 detects signals recorded in tracks from the initial position in step S21. The above synchronizing process will be explained below with respect to FIG. 2.

The R/F unit 20 equalizes the RF signals detected by the optical pickup 11, shapes the detected signals into binary signals which are pulse-waveforms, and outputs the binary signals to the digital signal processor 80. At the same time, the R/F unit 20 produces a binary signal clock RFCK whose edges are in-phase with transition points of the binary signals and applies the binary signal clock to the PLL 60. Then, the PLL 60 phase-locks the self-oscillating clock WFCK with the binary signal clock RFCK.

Specifically, with reference to FIG. 2, the phase difference detector 61 in the PLL 60 compares the phase of the binary signal clock RFCK produced from the R/F unit 20 with the phase of the self-oscillating clock WFCK, which will be used as the data reading clock, and outputs a pulse whose width is equal to the phase difference between the two clocks. The low-pass filter 61 filters out high frequency components of the pulses from the phase difference detector 61 and passes only the average DC component, which is proportional to the average of the phase difference. The VCO 63 increases or decreases the frequency of the self-oscillating clock WFCK about the center frequency, which is set by the microcomputer 70, corresponding to the level of the DC component.

The frequency-adjusted clock WFCK feedbacks to the phase difference detector 61, and the phase-adjusting process continues to repeat. That is, the synchronizing process continues until the phase difference detected by the phase difference detector 61 becomes zero; in other words, until the self-oscillating clock WFCK is in-phase with the binary signal clock RFCK applied from the R/F unit 20.

The self-oscillating clock WFCK synchronized with the binary signals converted from the reproduced RF signals is applied to the digital signal processor 80 as the data reading clock. The digital signal processor 80 converts the binary signals outputted from the R/F unit 20 into bit streams based on the data reading clock, and then demodulates the bit streams into a series of 8-bit data, sequentially. While restoring data as above, the digital signal processor 80 checks how many times special sync data is detected in a predetermined-sized data recording unit within a given time window. If the number of sync data detections is equal to the prescribed value, the digital signal processor 80 outputs the GFS signal to the microcomputer 70. Then, as part of step S21, the microcomputer 70 controls the digital signal processor 80 to restore the binary signals into original digital data based on the synchronized data reading clock and to output the restored digital data to an external device.

When a long jump from the present track P1 on which the optical pickup 11 is located to another track P2 (target location) is requested during the above-explained reproduction in step S30, the microcomputer 70 moves the optical pickup 11 to the desired target track P2 inward or outward by driving the sled motor 12b through the motor driver 40. At the same time, the microcomputer 70 calculates the reproduction speed adequate for the target location P2 in step S31 before the movement to the target location is completed.

To calculate the reproduction speed of the target location, the current rotation speed (rpm) of the spindle motor 12a should be detected. The reason for detecting the current rotation speed, without using an initial rotation speed, i.e., 5000 rpm although the rotation speed is almost constant across all area on the disk in the CAV mode, is that in some unusual cases the rotation speed changes. One of the unusual cases is when the rotation speed decreases because of a data reading failure. That is, if data reading fails at the current rotation speed, the rotation speed steps down by 500 rpm after every data recovery failure.

To detect the current rotation speed of the spindle motor 12a, the microcomputer 70 sets a specific time, for example, 0.1 second in the timer 71, and then starts the timer 71. While the timer 71 is running, the counter 50 continues to count pulses output from the Hall sensor 13. When the 0.1 second set in the timer 71 expires, the microcomputer 70 stops the timer 71, reads out the value counted by that time in the counter 50, and searches the memory 72 for the value which is the same or closest to the counted value to determine the current rotation speed.

For example, supposing that the memory 72 stores pulse values of 26 and 32 for 4000 rpm and 5000 rpm, respectively, and the number counted for 0.1 second is 27, the microcomputer 70 searches 27 in the memory 72, determines that the stored 26 is closest to 27, confirms the current rotation speed of the spindle motor 12 as 4000 rpm stored in connection with the number 26, and memorizes the current rotation speed to use in the calculation of the reproduction speed of the target location.

The calculation of the reproduction speed for the target location based on the detected current rotation speed is as follows.

Figure 5:
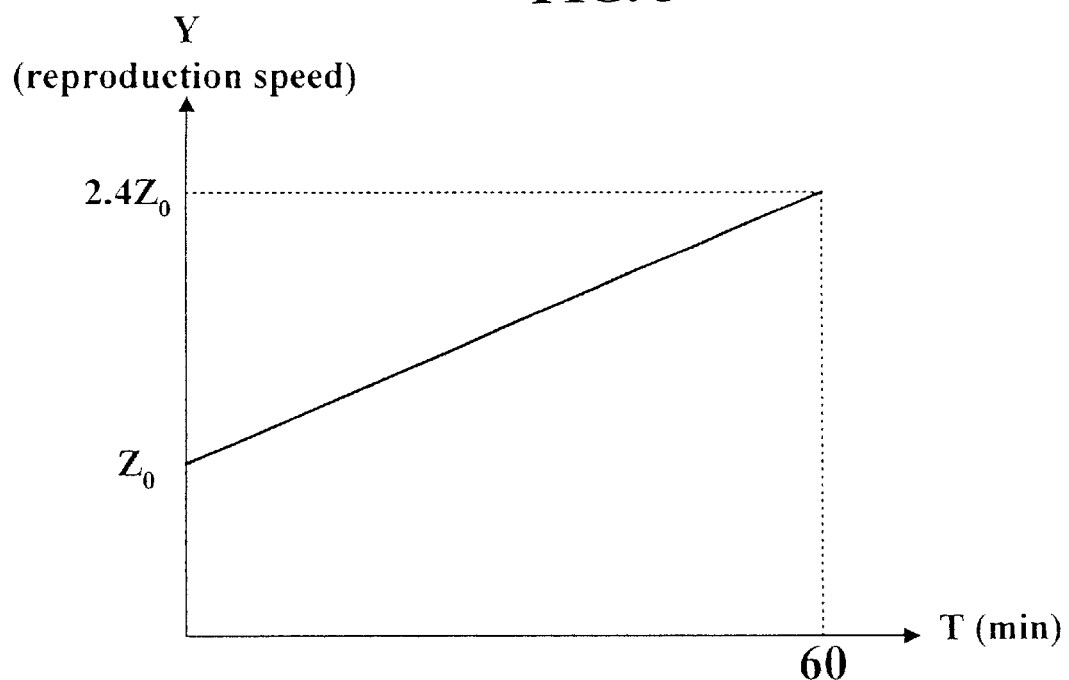
FIG. 5 is a simplified illustrative graph of reproduction speed versus radius for an optical disk.

Assuming that the storage capacity of the optical disk 10 is 60 minutes and the reproduction speed ratio of the outer-most peripheral track to the inner-most peripheral track is 2.4 in CAV mode, the reproduction speed versus radius for the optical disk is almost same as the graph shown in FIG. 5.

Referring to FIG. 5, the reproduction speed Y on a arbitary track T, where T is expressed in units of time (e.g. minutes), is given by Eq. 1, $$Y = \frac{(2.4Z_0 - Z_0)}{60}T + Z_0 = \frac{1.4Z_0}{60}T + Z_0 \quad (1)$$

where the constant Zo is the reproduction speed on the inner-most track.

If the reproduction speed is 1× on the inner-most track, the rotation speed F of the disk is depicted in Eq. 2, $$F = \frac{1.3}{2\pi r} \times 60 \quad (2)$$

where r is the radius of the inner-most peripheral track of the optical disk 10.

Accordingly, the reproduction speed of the innermost track $Z_0$ in terms of F is shown in Equation 3.

$$Z_0 = \frac{R}{F} = \frac{R \times 2\pi r}{1.3 \times 60} \quad (3)$$

where R is the detected rotation speed.

Substituting Eq. 3 into Eq. 1, the final expression for reproduction speed Y is given by Eq. 4.

$$Y = 0.00282RT + 0.12083R \quad (4)$$

Since the variable R is the detected current rotation speed and the variable T is the target track or location, the reproduction speed Y for the target location is easily obtained by substituting the detected rotation speed for R and the target location for T in Eq. 4.

Returning to FIG. 4, when the calculated reproduction speed Y for the target location is obtained according to the above process, the microcomputer 70 sets the center frequency of the self-oscillating clock WFCK of the PLL 60 in step S32 to correspond with the obtained reproduction speed by changing the voltage applied to the VCO 63 before the movement of the optical pickup 11 to the target location is completed. Thus, the data reading clock will have a center frequency close to the frequency of the signals to be reproduced from the target location, and will become quickly phase-locked with the signals reproduced at the target location in step S33. Therefore, the phase-locked data reading clock is applied to the digital signal processor 80 so that the recorded signals in the target location of the optical disk 10 can be restored to original data as soon as the pickup 11 reaches the target track.

While the present invention has been described for a specific optical disk (e.g. an optical disk having a storage capacity of 60 minutes), the present invention is not limited to use with a particular optical disk. Also other methods for determining the current rotation speed exist, and the present invention is not limited to the described method of determining a current rotation speed.

For example, another method for detecting the current rotation speed will now be explained.

The data reading clock is synchronized with the data speed reproduced from the disk and the data speed is proportioned to the reproduction speed. Accordingly, if the speed of the data reading clock is detected, it is possible to know the reproduction speed of the current location by using the proportional relation. And, since the information on the current reproduction position, which is MSF (Minute, Second, and Frame) value recorded in sub-Q channel of data block to indicate absolute location, is contained in the reproduced data, the current radius can be estimated based upon the location information while reproducing data. Thus, multiplying the known reproduction speed by the estimated radius results in the current rotation speed.

The method and apparatus according to the present invention are able to reproduce recorded signals on an optical disk immediately after movement of an optical pickup to a target location by changing the clock for data reading before movement of the optical pickup to the target location is complete, thereby achieving quick access and stabilization during a track jump operation.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for accessing tracks on an optical disk, comprising:

driving the optical disk in a CAV mode;

receiving a request to jump an optical pickup to another track;

detecting a current rotation speed in a current location of the optical pickup when the request is received, the current location being determined by data reproduced from the optical pickup;

determining a reproduction speed of a target location on the optical disk based on the current rotation speed;

adjusting a data reading clock so as to correspond to the determined reproduction speed in the target location during a movement of the optical pickup to the target location, the data reading clock being synchronized with a signal reproduced from the optical pickup; and processing the signal reproduced at the target location based on the adjusted data reading clock.

2. The method of claim 1, wherein the detecting step detects a rotation speed of a motor rotating the optical disk, the detected rotation speed being the current rotation speed.

3. The method of claim 1, wherein the detecting step detects the current rotation speed based on the data reading clock in the current location and the determined current location.

4. The method of claim 1, wherein the determining step determines the reproduction speed using a linear function having the current rotation speed and the target location as variables.

5. The method of claim 4, wherein the linear function is based on a recording length of the optical disk.

6. The method of claim 5, wherein the target location is expressed in units of time.

7. The method of claim 4, wherein the target location is expressed in units of time.

8. The method of claim 1, wherein the adjusting step adjusts the data reading clock before movement of the optical pickup to the target location is complete.

9. The method of claim 1, wherein the processing step converts the reproduced signal into bit streams based on the data reading clock.

10. An apparatus for accessing tracks on an optical disk, comprising:

an optical pickup;

a driving unit moving the optical pickup in a radial direction of the optical disk;

a clock generator generating a data reading clock synchronized with signals reproduced by the optical pickup;

a data processor processing the reproduced signals based on the data reading clock; and a controller determining a current rotation speed when receiving a request to jump the optical pickup to another track in a CAV mode and a reproduction speed of a target location on the optical disk based on the current rotation speed, and adjusting the data reading clock generated by the clock generator based on the determined reproduction speed during a movement of the optical pickup to the target location.

11. The apparatus of claim 10, wherein the controller measures a rotation speed of a motor rotating the optical disk, the measured rotation speed being the current rotation speed.

12. The apparatus of claim 10, wherein the controller determines a current location of an optical pickup from data reproduced from the current location, and determines the current rotation speed based on the data reading clock and the determined current location.

13. The apparatus of claim 10, wherein the controller determines the reproduction speed using a linear function having the current rotation speed and the target location as variables.

14. The apparatus of claim 13, wherein the linear function is based on a recording length of the optical disk.

15. The apparatus of claim 14, wherein the target location is expressed in units of time.

16. The apparatus of claim 13, wherein the target location is expressed in units of time.

17. The apparatus of claim 10, wherein the controller adjusts the data reading clock before movement of the optical pickup to the target location is complete.

18. The apparatus of claim 10, wherein the data processor converts the reproduced signal into bit streams based on the data reading clock.

19. An apparatus for accessing tracks on an optical disk, comprising:
    an optical pickup detecting signals recorded on an optical disk;
    a clock generator generating a data reading clock synchronized with signals reproduced by the optical pickup; and
    a controller calculating a reproduction speed at a target location when receiving a request to jump the optical pickup to another track in a CAV mode, to which the optical pickup is moving, and adjusting the data reading clock based upon the calculated reproduction speed of the target location before the optical pickup completes moving to the target location, the data reading clock being used to restore the detected signals into digital data.

20. The apparatus of claim 19, wherein the controller detects the current rotation speed of the optical disk, determines a slope and constant values of a linear function according to the detected current rotation speed, and calculates the reproduction speed of the target location by substituting a value of the target location into a variable of the determined linear function.

21. The apparatus of claim 20, wherein the value of the target location to be substituted into the determined linear function is expressed as time.

22. The apparatus of claim 19, wherein the controller calculates the current rotation speed based on information on a current location and a frequency of the data reading clock synchronized with the signals detected at the current location, determines a slope and constant values of a linear function according to the calculated current rotation speed, and calculates the reproduction speed of the target location by substituting a value of the target location into a variable of the determined linear function.

23. The apparatus of claim 22, the value of the target location to be substituted into the determined linear function is expressed as time.

24. A method for accessing tracks on an optical disk, comprising:
    driving the optical disk in a CAV mode;
    receiving a request to jump an optical pickup to another track;
    detecting a current reproduction speed based on a reading speed of data reproduced by the optical pickup when the request is received;
    determining a reproduction speed of a target location on the optical disk based on a linear function of reproduction speed between the current location and the target location;
    adjusting a data reading clock based on the determined reproduction speed during a movement of the optical pickup to the target location, the data reading clock being synchronized with a signal reproduced from the optical pickup; and
    processing the signal reproduced at the target location based on the adjusted data reading clock.

* * * * *